No. 748,525.

Patented December 29, 1903.

UNITED STATES PATENT OFFICE.

ROBERT S. PERRY AND HERMAN G. SCHANCHE, OF PHILADELPHIA, PENNSYLVANIA.

PROCESS OF DRYING SULFATE OF ALUMINIUM.

SPECIFICATION forming part of Letters Patent No. 748,525, dated December 29, 1903.

Application filed October 20, 1903. Serial No. 177,720. (No specimens.)

*To all whom it may concern:*

Be it known that we, ROBERT S. PERRY, of No. 5104 Pulaski avenue, and HERMAN G. SCHANCHE, of No. 3401 Grays Ferry road, Philadelphia, Pennsylvania, citizens of the United States, have invented a certain new and useful Process for the Drying of Sulfate of Aluminium, whereof the following is a specification.

The ordinary commercial sulfate of aluminium in its normal or unconcentrated condition contains approximately fifty-seven per cent. of sulfate of aluminium and forty-three per cent. of water, the percentage of alumina ($Al_2O_3$) being about 17.32. For various purposes in the arts it is desirable to obtain a product having a higher percentage of alumina—say from twenty-two to twenty-three per cent. In order to thus concentrate the sulfate of aluminium, it is necessary to drive off a certain amount of the water normally contained therein; and the purpose of the present invention is to accomplish this result with economy and certainty, while maintaining the product in a proper physical condition.

The behavior of sulfate of aluminium when heated is peculiar. Thus when the material is in a melted state—as, for instance, in the final stage of manufacture—it is found that after the water has been reduced to about the normal percentage above stated the further elimination thereof becomes economically impracticable.

If the sulfate of aluminium be allowed to assume a solid condition and be heated either in lumps or powder to drive off the water, it is liable to melt either superficially or internally, the consequence being that it may glaze over upon the exterior or may develop bubbles or blisters and by further drying yield a light fluffy product, which is not desirable. Any drying or concentrating process to be commercially practicable must be conducted without melting the sulfate of aluminium either locally or throughout its mass. On the other hand, economic success requires that the concentration should be effected as rapidly as possible to avoid waste of heat, undue protraction of the treatment in point of time, and physical deterioration.

We have discovered that there is a progressive range or series of critical temperatures within which sulfate of aluminium may be treated with safety in the drying process until a degree of concentration corresponding to a percentage of about twenty-three per cent. of alumina has been reached. We believe this peculiarity to be due to a factor which we have determined by experiment—viz., that the melting-point of the sulfate of aluminium progressively rises as the water is eliminated down to about the degree of concentration mentioned. Thereafter the melting-point rises suddenly to a temperature which may be said to correspond with that of dissociation.

Thus to give in tabulated form a typical instance of ordinary commercial sulfate of aluminium the progressive range corresponding to degrees of concentration may be stated approximately as follows:

| Percentage of water. | Percentage of $Al_2O_3$. | Melting-point. |
|---|---|---|
| 43. | 17.32 | 227° F. |
| 34.3 | 19.88 | 233° F. |
| 34. | 20.04 | 238° F. |
| 29.3 | 21.36 | 242° F. |
| 25.3 | 22.56 | 255° F. |
| 24.3 | 22.88 | 270° F. |
| 23.2 | 23.16 | Not melting at—700° F. |

We have found that if the drying or concentrating process by the application of heat be started at a proper temperature the heat may be progressively increased in accordance with the conditions developed by the drying, so as to obtain the ultimate result with the greatest economy of fuel and time and to yield a product which possesses the desired characteristics—viz., homogeneous, solid, and relatively heavy particles or lumps. Our process therefore consists in driving off the water from the sulfate of aluminium by the application of progressively-increasing temperatures controlled with definite relation to the melting-points of the material as such melting-points rise in accordance with the diminishing percentages of water. In making this statement, however, we must call attention to the fact that the actual temperature of the heated medium within which the sulfate of aluminium is exposed is not directly communicated to the material itself throughout its mass, but becomes modified at succeeding points of penetration, owing to the factor of evaporation of the water, which of course tends to locally retard the rise of temperature.

Thus assuming that a lump of normal unconcentrated sulfate of aluminium be exposed in a chamber containing air at a given temperature—say 227° Fahrenheit—the first effect is to evaporate water from the surface of the lump, and such evaporation tends to prevent the superficial layer from attaining the full temperature of the surrounding medium. As, however, the evaporation progresses the percentage of water in the superficial layer is reduced, and although the actual temperature of the medium may be then communicated to such layer the melting-point of that portion of the sulfate of aluminium which constituted said layer has been raised in consequence of the local diminution of the percentage of water, so that such portion of the sulfate of aluminium is no longer liable to be injuriously affected by the temperature which it is now capable of directly attaining. The action of concentration thus progresses inwardly toward the center of the lump or particle, and by a properly-controlled rise of the temperature of the external medium the water can be driven off with the maximum rapidity without subjecting the sulfate of aluminium to the danger of melting.

We have found that the drying operation may be commenced at a temperature considerably above the theoretical melting-point of the normal sulfate of aluminium, which corresponds with the then-contained percentage of water, probably because the relatively rapid evaporation at the commencement effects for the time a substantial reduction of temperature locally, and we therefore do not wish to limit ourselves to a drying process which commences with the application of heat below the actual melting-point, (above indicated as 227° Fahrenheit,) although we prefer to begin the process in the neighborhood of that temperature. If, however, the drying be started at a temperature as high as 275° Fahrenheit, the difficulty above referred to, which results in melting of the surface and glazing or the formation of bubbles and blisters, takes place, whereas if the initial temperature is not too high an ultimate temperature of as much as 320° Fahrenheit can be obtained without injurious results. The initial temperature therefore should not be as high as 275° Fahrenheit. We do not deem it necessary to describe an apparatus for the conduct of our process, since it is obvious that any ordinary form of drying apparatus might be utilized, it being only essential that the temperature of the drying-chamber should be under control. Our process therefore consists in commencing the drying of the sulfate of aluminium at a temperature preferably at or near its theoretical melting-point, but below 275° Fahrenheit, and raising said temperature at a rate not exceeding the progressively-rising melting-points of the material undergoing treatment, the ultimate temperature which we have found advantageous being about 320° Fahrenheit.

Having thus described our invention, we claim—

1. The hereinbefore-described process of concentrating sulfate of aluminium, which consists in subjecting the material to heat, of such degree that the communicated temperature, under the conditions of evaporation, is slightly lower than the melting-point of the sulfate of aluminium, substantially as set forth.

2. The hereinbefore-described process of concentrating sulfate of aluminium, which consists in subjecting the material to heat, of such degree that the communicated temperature, under the conditions of evaporation, is slightly lower than the initial melting-point of the sulfate of aluminium, and increasing the heat at a ratio not exceeding the progressively-rising melting-point of the sulfate of aluminium, substantially as set forth.

3. The hereinbefore-described process of concentrating sulfate of aluminium, which consists in subjecting the material to heat, commencing at a temperature of about 227° Fahrenheit and increasing the heat at a ratio not exceeding the progressively-rising melting-point of the sulfate of aluminium, to about 320° Fahrenheit, substantially as set forth.

In witness whereof we have signed our names to this specification, this 19th day of October, A. D. 1903, in the presence of two subscribing witnesses.

ROBERT S. PERRY.
HERMAN G. SCHANCHE.

Witnesses:
FREDRIK JAHN,
W. W. KIENZEL.